3,565,652
METHOD OF COLORING VISCOSE
Staats G. Burnet, Mobile, and Donald S. Nelson, Eight Mile, Ala., assignors to Courtaulds North America Inc., New York, N.Y., a corporation of Alabama
No Drawing. Filed May 22, 1967, Ser. No. 640,337
Int. Cl. C08b *21/20;* D01f *3/12, 3/18*
U.S. Cl. 106—165         2 Claims

ABSTRACT OF THE DISCLOSURE

Shaped articles of regenerated cellulose are given opacity or color or both by introducing a glass frit into viscose from which the articles are made.

---

This invention relates to colored shaped articles of regenerated cellulose, to a method for making such articles and to viscose suitable for use in said method.

Pure regenerated cellulose is colorless, and indeed transparent. Regenerated cellulose fiber and film may be, and conventionally are, colored by various dyeing techniques applied to the performed article. However, superior fastness to washing and light can be obtained by the so-called "spin dyeing" technique.

Spin dyeing, as applied to the viscose process, which is the most widely used method for making regenerated cellulose, is normally carried out by preparing a concentrated dispersion of a pigment in viscose or in some other vehicle such as carboxymethyl cellulose. A cationic dispersing agent is normally added and the concentrate is subjected to extended treatment in a colloid mill, for example, to avoid agglomeration. The concentrate is then injected into the main viscose stream just prior to spinning. Addition of dry pigment to the main viscose stream is impractical because the pigment agglomerates on being added to the caustic viscose.

Apart from the inconvenience of preparing color concentrates, spin dyeing has also been handicapped in that it has not hitherto been adaptable to certain pigments, e.g., chromium and cobalt oxides, because while these pigments have very attractive colors, when introduced into viscose they promote depolymerization of the cellulose, causing great loss of strength in the filamentary product.

Spun dyed fiber is in general more resistant to color deterioration through exposure of light than fiber colored by other means. Even so, however, color stability is not as great as might be desired. For example, white rayon fiber which has been opacified or pigmented with $TiO_2$ through the spin dyeing technique tends to develop a creamy or slightly yellow hue after prolonged exposure to sunlight.

It has now been found that these and other difficulties in the spin dyeing of viscose can be overcome by introducing the pigment, opacifier or coloring agent in the form of a finely divided glass frit. By using a frit as the color bearing material, it is possible to add the colorant as a dry powder to the viscose immediately before spinning, without preliminary preparation of a concentrate, because the frits do not agglomerate in alkaline solution. Pigments such as cobalt and chromium oxides can be used without serious adverse effect on filament strength, and the resulting product is far more stable to light than has been found to be the case with prior products.

The invention, in one aspect, therefore, comprises a method of forming colored regenerated cellulose shaped articles which comprises adding a finely divided glass frit to viscose and forming said viscose into the desired articles.

In a further aspect, the invention envisions a novel viscose containing a finely divided glass frit.

In yet a further aspect, the invention includes a colored, regenerated cellulose shaped article containing particles of a glass frit.

The term "colored" is used herein to include white. Indeed one of the most important pigments is $TiO_2$, which is, of course, used to render the cellulose white or opaque.

The "shaped articles" made according to the invention may have any desired configuration. The invention finds its most attractive application in the production of filamentary material, either staple fiber or continuous filament yarns or bundles. Other specific areas of use are in the production of films and cellulose sponge.

The glass frits which are suitable for use in carrying out the invention may include almost any frit which is reasonably stable to caustic. Of course, almost all glasses will dissolve in caustic soda to a certain extent, and absolute inertness is not required. It is only necessary that in the period between when the glass is added to the viscose and when the viscose is spun, which will seldom be more than say 2 hours, the glass remains substantially undissolved.

Glasses having these properties are readily compounded by those skilled in the art from mixtures of silica and various combinations of the oxides of aluminum, boron, sodium, potassium, lithium, calcium, magnesium, barium, lead, and zinc, among others.

Normally the frit will contain a colored component, for example, an oxide or other compound of chromium, cobalt, selenium, titanium, iron, copper, antimony, nickel and zirconium. This may be present as a separate crystalline phase bonded by the glass or it may be dissolved in the vitreous phase. However the glass need not contain a color component. Clear glass, finely divided, may be introduced as such into the viscose to give a white opacified filament comparable to that usually obtained by the introduction of $TiO_2$.

Although the frit compositions are described, in accordance with conventional practice, in terms of oxides, it will be understood that the various components are not necessarily present as oxides but may be combined in various ways with one another. Further it will be understood that in manufacturing the glass the several components may be introduced in various forms, e.g., as the carbonates or as commercially available minerals.

The amount of frit introduced into the viscose will vary with the depth of color desired and, of course, with the strength of the color of the frit. The limiting factor is in general the loss of strength in the product due to the dilution of the cellulose by the frit. On the average, between about 0.5% and about 9% frit on the weight of bone dry cellulose will be added and will appear in the final product.

For obvious reasons the frit must be in a finely divided state when added to the viscose. In the case of filaments, the particles must be small enough to be spun without excessive abrasion of the spinnerette orifices and must not approach the average diameter of the filaments. Normally an average particle size will be around 1 to 3 microns though this is not deemed to be a critical range.

The viscose to which the frit is added may be any of the known compositions. Typical viscoses for spinning textile grade rayon fiber contain say 8–9% cellulose, and 5–5.5% NaOH, and are spun at a salt factor of say 4.8 to 6.5. However, special viscoses such as those used to make high wet modulus fiber (see Tachikawa Pat. Nos. 2,592,335 and 2,732,279) or tire yarn, may also be colored by the present technique. Viscose modifiers of various types, ordinarily used to make "all skin" or "thick skin" filaments (see Cox 2,937,070, for example) may also be present in the viscose, as may other conventional additives.

As noted, the frit may be added to the viscose about to be spun as a dry powder, without danger of agglomeration and with only the normal agitation required to secure a uniform dispersion. Special devices such as colloid mills are unnecessary. For convenience, in place of adding the dry pigment to the viscose, it may be dispersed in water as a slurry and the slurry added. Of course, color concentrates in viscose or other vehicles conventionally used may also be prepared but such concentrates are not necessary and one of the advantages of the invention is that it enables the preparation of concentrates to be avoided.

The viscose containing the frit may be spun according to conventional techniques into any of the coagulating or regenerating spin baths known to the art. It will be recognized that the composition of such baths may vary widely. For conventional textile grade rayon, the bath will normally contain say 9.5 to 10.5% $H_2SO_4$; 22.5 to 25.5% $Na_2SO_4$, and 0.7 to 1.0% $ZnSO_4$. Various conventional spinning assistants such as those used to prevent spinnerette incrustation may be present. Other baths, such as those having very low regeneration power as disclosed in the Tachikawa patent referred to may be used, as may the baths of the Cox patent, or the baths conventionally used for tire yarn. In short, the nature of the spin bath is a matter of indifference so far as the applicability of the present invention is concerned.

Aging the spinning speed is normally from say 40 to 100 meters/min., but again this is irrelevant to the invention, and will be determined by other factors known to the art quite independently of the presence of the coloring materials of the invention.

After removal from the spin bath, the filaments may be stretched, fixed, washed, dried, cut into staple or otherwise processed as desired. The final product will contain, as noted, from about 0.5 to 9% by weight of the frit. Usually this will be uniformly distributed across the filament although where, through special techniques, parts of the filaments are made more dense than others, somewhat more of the frit may be present in the dense portion of the filament.

The invention will be further described in the following specific examples which are given for purpose of illustration only and are not to be taken as in any way restricting the scope of the appended claims.

EXAMPLE I

A frit having the following composition:

| Oxide: | Wt. percent |
|---|---|
| $K_2O$ | 5.9 |
| $Na_2O$ | 5.9 |
| $CaO$ | 8.1 |
| $Al_2O_3$ | 9.5 |
| $B_2O_3$ | 21.5 |
| $SiO_2$ | 49.1 |
| | 100.0 | is milled to an average particle size of about 2.5 microns and added dry, with stirring, to a viscose containing, by weight, 8.75% cellulose and 5.2% NaOH, in an amount calculated as 3.0% on cellulose. The viscose is spun at a salt factor of 5.8 and a speed of 60 meters/min. into a 51° C. bath containing 10.0% $H_2SO_4$, 25% $Na_2SO_4$, and 0.8% $ZnSO_4$, to form filaments. The filaments are removed from the bath, stretched 55%, desulfurized, washed, cut into staple, and dried. They have an average condition tenacity (65% R.H.) of 2.0 g./den. and an average conditioned extensibility of 14.2%. They are pure white in color.

EXAMPLE II

The glass frit described above is ground and mixed intimately with 15%, based on the combined weights, of $TiO_2$. The mixed powder is then fired at about 2100° F. to melt the frit and give a homogenous augmented frit. This in turn is milled to an average particle size of about 2.5 microns. The resulting powder is added to the viscose of Example I as an aqueous slurry containing about 40% frit, the proportion being calculated to give 3.0% frit on cellulose. The viscose is spun as in Example I to give pure white fibers having a Fadeometer I to give pure white fibers having a Fadeometer rating of L-5. Fibers containing the same proportion (3.0%) $TiO_2$ have a Fadeometer rating of L-4.

EXAMPLE III

A frit having the following oxide composition

| Oxide: | Wt. percent |
|---|---|
| $Al_2O_3$ | 5.3 |
| $SiO_2$ | 41.6 |
| $BaO$ | 53.1 |
| | 100.0 | is ground and supplemented with 15%, on the weight of the mixture, of cobalt oxide. The combined powders, intimately mixed, are then fired at about 2300° F. to form a blue frit, which is milled to an average particle size of about one micron. This powder is then added in a proportion of about 3.0% on cellulose to viscose as in Example II and the viscose is spun to give a blue fiber which is highly resistant to fading.

EXAMPLE IV

The procedure of Example III is repeated, using as the colorant, smalt, a cobalt-potassium frit conventionally used to color pottery. Again a blue fiber is obtained.

EXAMPLE V

A frit supplied by the Ferro Corporation of Cleveland, Ohio, and identified as Frit CR-970, High Refractive Index, is spun using conventional viscose and spinning systems at 3.0% bone dry frit on bone dry spun cellulose.

The resulting 3 denier fiber, upon conventional finishing and mild $H_2O_2$ bleaching, has a whiteness on an arbitrary grey (0-20) scale of 2, whereas conventional bleached unpigmented or delustered ($TiO_2$) fibers produced similarly are visually rated at 5-10 on the grey scale.

The resulting product, while exhibiting unusual whiteness in spun yarn, preserves much of the surface luster of unpigmented cellulose fibers, and possesses the opacity of $TiO_2$ pigmented cellulose fibers.

What is claimed is:
1. A method of forming shaped colored articles of regenerated cellulose which comprises adding to viscose as a dry powder or as an aqueous slurry, between about 0.5 and about 9% by weight of bone dry cellulose of a finely divided, viscose stable, silica-base glass frit having an average particle size not exceeding 3 microns and directly forming the viscose into the desired shape.

2. The method claimed in claim 1 wherein the viscose containing the frit is spun to form filaments.

References Cited

UNITED STATES PATENTS

| 2,650,168 | 8/1953 | van Dijk et al. | 106—165 |
| 2,863,783 | 12/1958 | Greenstein | 106—193I |
| 3,318,988 | 5/1967 | McDowell | 106—165 |

FOREIGN PATENTS

| 478,523 | 1/1938 | Great Britain | 106—288I |
| 1,055,004 | 1/1967 | Great Britain | 106—288I |

OTHER REFERENCES

"The Condensed Chemical Dictionary," sixth edition, 1961, Reinhold Publishing Corporation, p. 516.

ALLAN LIEBERMAN, Primary Examiner

U.S. Cl. X.R.

106—164, 166, 168